March 15, 1966  J. A. MAS  3,240,947
ELECTRIC POWER SUPPLY
Filed July 20, 1962  2 Sheets-Sheet 1
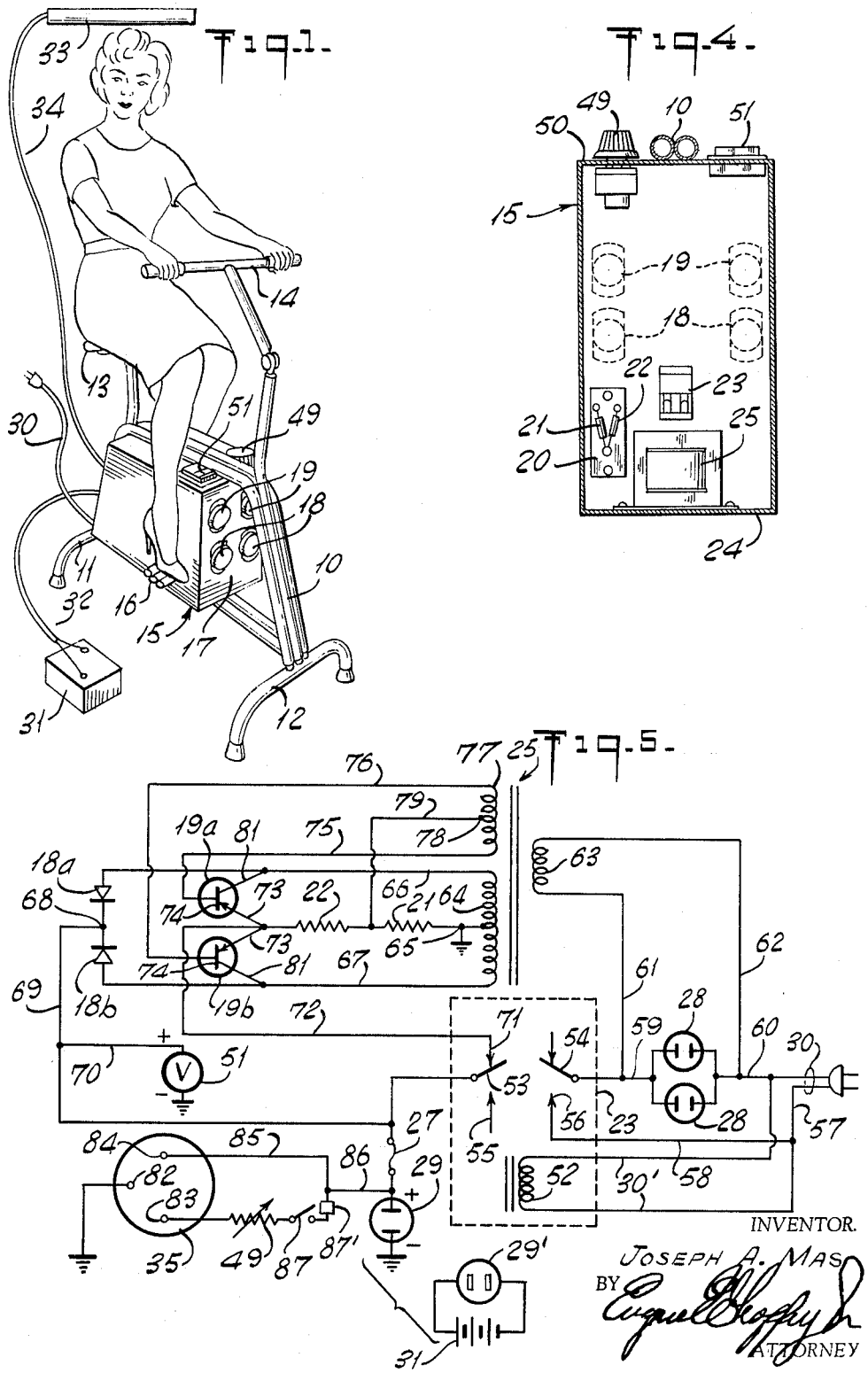
INVENTOR.
JOSEPH A. MAS
BY Eugene Brophy Jr.
ATTORNEY

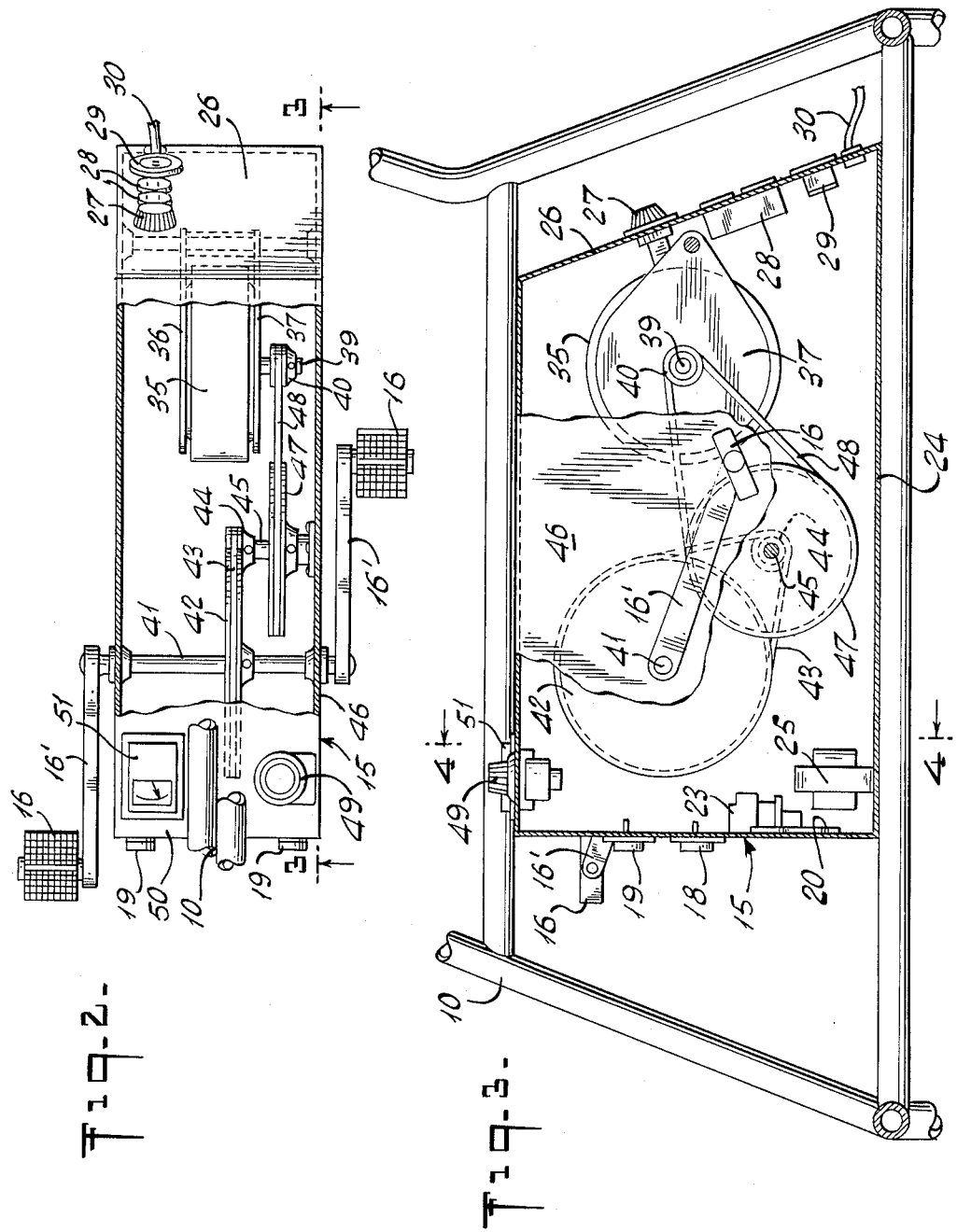

United States Patent Office 3,240,947
Patented Mar. 15, 1966

3,240,947
ELECTRIC POWER SUPPLY
Joseph A. Mas, Woodbury, N.Y., assignor to Dynamic Instrument Corp., a corporation of New York
Filed July 20, 1962, Ser. No. 211,958
5 Claims. (Cl. 290—50)

This invention relates to electric power supplies and more specifically concerns a novel and improved power supply and control means therefor which is useful, among other things, for emergency lighting systems. The invention further contemplates a novel and improved electronic oscillator which produces an excellent waveform and is particularly adaptable for charging battery-powered supplies and for the conversion of battery power to power useful for energizing conventional electric lamps as, for instance, fluorescent lamps and the like.

The emergency lighting system in accordance with the invention, while particularly applicable for use in connection with fall-out shelters, also affords numerous advantages when utilized in connection with emergency lighting systems for commercial buildings, residences and the like. Known emergency power systems have generally employed the conventional arrangement of a battery, a lighting source directly energized by the battery and a suitable relay control for connecting the lighting source to the battery upon failure of the commercial power. Such systems have many disadvantages since the batteries are of relatively low voltage and incandescent lighting sources are required for use in connection with the batteries. In cases wherein the battery power is modified to produce relatively high voltage alternating current, the electronic equipment for attainment of this end as well as for charging the batteries from commercial power becomes relatively complicated and expensive.

This invention overcomes the disadvantages of known emergency lighting systems and provides an improved system that is characterized by its dependability, simplicity and relatively low cost.

Another object of the invention resides in the provision of a novel and improved emergency lighting system including manually operable means for maintaining the charge in the emergency battery at all times.

Another object of the invention resides in the provision of a novel and improved circuit that may be energized from the primary power source for the purpose of charging the emergency battery and upon interruption of the primary power source will function to convert power from the emergency source to alternating current energy for illuminating conventional lamps such as fluorescent lamps and the like.

A further object of the invention resides in the provision of a novel and improved oscillator.

Still another object of the invention resides in the novel and improved converter and inverter which embodies an improved arrangement of elements for effecting rectification of alternating current during conversion of A.C. power to D.C. power and which elements function during inversion to minimize the generation of high amplitude peak voltages which are normally encountered in known circuits for power inversion.

Still another object of the invention resides in the provision of a novel and improved emergency power supply for use in cooperation with a primary commercial power source wherein the emergency battery supply may be charged from the commercial or primary power source, and the energy from said battery is converted to a high alternating current voltage during the absence of the primary power source for providing illumination and operation of other electrical devices, and wherein means are included for manually maintaining the charge on the battery during interruption of the primary power source.

A still further object of the invention resides in the provision of a novel and improved emergency power supply.

The above and other objects of this invention will become more apparent from the following description and accompanying drawings forming part of this application:

FIGURE 1 is a perspective view of one embodiment of an emergency lighting system in accordance with the invention.

FIGURE 2 is a top view of the power supply structure shown in FIG. 1 with a portion of the top surface broken away.

FIGURE 3 is a cross-sectional view of FIG. 2 taken along the line 3—3 thereof.

FIGURE 4 is a cross-sectional view of FIG. 3 taken along a line 4—4 thereof, and FIGURE 5 is a circuit diagram of the electrical control in accordance with the invention.

The invention essentially comprises an improved power supply system particularly useful for emergency lighting, though as the description proceeds it will be observed that it is useful for energizing other electrical devices. Broadly the power supply includes a relay control energized by commercially available power for energizing electric lights or other electrical appliances and upon failure of the power the relay operates to provide emergency power from an emergency soucre. The emergency power is obtained from a battery which operates through an appropriate oscillatory circuit to produce alternating current power of substantially the same frequency and magnitude as the commercial power. During periods when commercial power is available the commercial power is utilized to charge the battery in order to maintain the battery at a full charge at all times. During periods when commercial power is not available, manual means are provided for charging the battery. When the emergency system is utilized in fallout shelters where individuals are confined for extended periods of time the manually operated generator provides the additional function of affording exercising means for the individuals to maintain them in good physical condition during confinement in the shelter.

Another aspect of the invention concerns the improved circuitry which is utilized for both charging the battery and for producing alternating current for operation of the electrical devices. Through a novel and improved arrangement of elements an output wave form is obtained that has excellent configuration and substantially free from high voltage spikes generally characteristic of similar oscillating devices.

Referring now to the housing 15, the front wall or panel 17 includes a pair of rectifiers 18 and a pair of transistors 19. These transistors and rectifiers are mounted on the front surface and in an exposed position to facilitate rapid replacement if necessary when the apparatus is used for emergency lighting. The inside of the front panel 17, as will be observed in FIG. 4, carries a terminal board 20 having resistors 21 and 22 mounted thereon and a relay 23. The bottom 24 of the housing 15 carries a transformer 25. The rear wall 26 includes a fuse holder 27, a conventional type electric outlet 28 for attachment of electrical devices such as fluorescent fixtures or the like, a receptacle 29 for attachment of the battery and a cable 30 for connecting the apparatus to the conventional or primary power source. The battery denoted by the numeral 31 in FIG. 1 may be a standard 12-volt battery and is connected to the box 15 by a cable 32. A light source 33 is connected to the box by a cable 34. As will be shown, the light source 33 is automatically energized by the primary power source during periods when primary power is available. Should the power be interrupted, the device automatically switches the light 33 to the battery power source and the battery through an electronic circuit produces power at a frequency and voltage substantially identical to that of the primary power source.

The manually operated generator within the box 15 is denoted by the numeral 35 and it is carried by a pair of bracket members 36 and 37, the latter being secured to a transverse rod 38. The generator is of the permanent magnet type and has a shaft 39 extending therefrom and carrying a pulley 40. The pedals 16 are carried by arms 16′ which are secured to a transverse shaft 41. This shaft carries a relatively large pulley 42 which is coupled by means of a belt 43 to a smaller pulley 44 on the countershaft 45. The countershaft 45 is rotatably secured to the side wall 46 of the box 15 and carries a second pulley 47, the latter being coupled to a belt 48 to the pulley 40. In the instant embodiment of the invention the speed ratio between the shaft 41 and the shaft 39 is roughly 20:1, though this ratio would be determined by the required speed of the generator 25 to develop an appropriate charging rate for the battery. The charging rate of the generator is controlled by a rheostat 49 carried on the top surface 50 of the box 15, and as will be shown controls the field coils in the generator. By adjusting this rheostat, the power required to operate the generator can be modified to accommodate the physical capabilities of the individual. In addition, a meter 51 provides an indication of the battery voltage at all times.

The circuit diaphragm of the control in accordance with the invention is illustrated in FIG. 5 and the numerals used to identify the electronic components in FIGS. 1 through 4 are used to identify the same components in FIG. 5.

The primary source of power for lighting the lamps connected to the outlets 28 is obtained through the cable 30 and this power is connected via leads 30′ to the coil 52 of the relay 23. When the coil 52 is energized the movable contacts 53 and 54 are pulley downwardly to engage the fixed contacts 55 and 56. When the movable contact 54 engages the contact 56 the primary source of power will be applied directly to the outlets 28 via lead 57, lead 58, contacts 56 and 54, lead 59, outlet 28 and lead 60. In addition, primary power is applied through the leads 61 and 62 to the primary 63 of the transformer 25. The secondary 64 of the transformer 25 has a center tap 65 connected to ground. The outside terminals of the winding 64 are connected through leads 66 and 67 to one side of the rectifiers 18a and 18b, respectively. The other terminals of the rectifier are connected together at 68 and then by lead 69 and fuse 27 to the connector 29, the latter receiving a cooperating connector 29′ for connection of the battery 31 thereto. The other side of connector 29 is connected to ground as indicated. In this way a rectified current is applied to the batteries to maintain its charge. The voltmeter 51 is connected between ground on one side and via the lead 70 to the hot side of the battery 31.

In the event the primary power source is interrupted, relay coil 52 will be de-energized and the movable contactors 53 and 54 will take the position shown in FIG. 5. It will be observed that the movable contactor 54 has disconnected one side of the power line from the outlets 28 and from the primary 63 of the transformer 25. At the same time the movable contactor 53 has engaged the fixed contact 71 which is connected through the lead 72 to the emitters 73 of the transistors 19a and 19b. The emitters are further connected through series connected resistors 22 and 21 to the ground terminal 65. The bases 74 of the transistors are connected via the leads 75 and 76 to the outside terminals of the secondary winding 77. The center tap 78 of the secondary winding 77 is connected via the lead 79 to the junction 80 of the resistors 21 and 22. The collectors 81 of the transistors 19a and 19b are connected to the leads 66 and 67 respectively.

The transistor circuitry as described forms a square wave oscillator for the generation of an alternating current in the primary winding 63 of the transformer with the battery power being applied effectively between the emitters 73 and the center tab 65 of the winding 64. The winding 77 comprises a feedback winding which causes the transistors 19a and 19b to conduct alternately and thereby produce an alternating current.

It is well-known that with a square wave oscillator of the type illustrated, a pair of transistors with feedback circuitry produces rather substantial switching transients. These transients are usually of exceedingly large amplitude and very short time duration, and present considerable difficulties in that they materially shorten the life of the transistor and require extreme care in the design of the transformer to maintain leakage inductance at a minimum. With this invention these undesirable transients are substantially minimized through the utilization of rectifiers 18a and 18b which normally function during the supply of primary power as the rectifying means for charging the battery. During emergency conditions it will be observed that the relay contacts 53 and 71 have connected the junction 68 of the two transistors to the emitters 73. Thus the rectifiers are effectively connected between the collector of each transistor and the emitter. In so doing the rectifier functions to minimize the amplitude of the undesirable transients by becoming conductive when the transients attain a predetermined level. Actual tests have indicated that the utilization of rectifiers together with a square wave generator as described avoids substantially all difficulties heretofore encountered with transients, and insures long transistor life and simplifies the design and construction of the transformer. The output voltage from the winding 64 is introduced into the winding 63 at a potential and frequency substantially corresponding to the potential and frequency of the primary power source.

During the utilization of the battery 31 for energizing the lighting sources connected to the outlets 28, as the battery voltage is reduced the battery can be recharged by operation of the generator 35. The generator has a field winding connected between the terminals 82 and 83, while the charging winding is connected between the terminals 82 and 84. The terminal 82 is connected to ground, while the terminal 84 is connected via a lead 85 and a lead 86 to the hot side of the battery connector 29. The terminal 83 is connected through the rheostat 49, switch 87, and a centrifugal switch 87′ to the lead 86. In this way, battery power is utilized to magnetize the field of the generator and the value of the resistance 49 in series with the field will control the charging rate as well as the manual energy required to operate the generator.

With the invention as described above, continuous electric power is available for lighting and other purposes even under conditions where the primary alternating current source is interrupted for extended periods. During the supply of alternating current power, the battery is automatically charged to supply emergency power whenever needed. Should battery power be required for extended periods, the battery may be recharged by manually operated generator means which insures the availability of power at all times. Furthermore, in the case of persons confined to fall-out shelters, the manually operated generator means affords an exercising device necessary to maintain the individuals in good physical condition, and if desired, battery power may be used at regular intervals in place of the primary power source in order to provide ample exercise for the persons living in the shelter.

The invention further provides an improved electronic circuitry which greatly simplifies the equipment and at the same time affords the numerous advantages discussed above, through a unique arrangement of elements. The electronic device automatically converts battery power to alternating current power for energizing the receptacle outlets 28 and by merely interrupting battery energy to the transistors and applying alternating current energy to the primary winding, this current is automatically rectified to provide energy for charging the battery.

While only one embodiment of this invention has been illustrated and described, it is apparent that alterations, changes and modifications may be made without departing from the true scope and spirit thereof.

What is claimed is:

1. Voltage conversion apparatus comprising a transistor oscillator having a transformer including at least one primary and one secondary winding, at least two transistors each having a base, an emitter element and a collector element, a tap on said secondary winding, connections between one element of each transistor and said centertap, connections of the other element of each transistor and an end terminal of said secondary winding, and means for applying signals to the bases of said transistors of selected phase relationship to the currents generated in said secondary winding, the first said connections including means for applying direct current energy to effect the generation of oscillatory currents in said secondary and producing alternating current power in said primary winding, at least two series connected rectifiers, a connection between the junction of said rectifiers and one side of said direct current applying means, connections between each of the other terminals of said rectifiers and said other elements and switch means in circuit between said one side of said direct current supplying means and said one element of each transistor whereby closure of said switch applies energy to said oscillator with a rectifier bridging the elements of each transistor and generating alternating current energy in said primary winding, and upon opening of said switch interrupts said oscillatory mode and upon application of alternating current to said primary winding said rectifiers operate to rectify said alternating current to produce direct current energy.

2. Voltage conversion apparatus comprising a transistor oscillator having a transformer including at least one primary and one secondary winding, at least two transistors each having a base, an emitter element and a collector element, a tap on said secondary winding, connections between one element of each transistor and said centertap, connections of the other element of each transistor and an end terminal of said secondary winding, and means for applying signals to the bases of said transistors of selected phase relationships to the currents generated in said secondary winding, the first said connections including means for applying direct current energy to effect the generation of oscillatory currents in said secondary and producing alternating current power in said primary winding, at least two series connected rectifiers, a connection between the junction of said rectifiers and one side of said direct current applying means, connections between each of the other terminals of said rectifiers and said other elements and switch means in circuit between said one side of said direct current supplying means and said one element of each transistor whereby closure of said switch applies energy to said oscillator with a rectifier bridging the elements of each transistor and generated alternating current energy in said primary winding, and upon opening of said switch interrupts said oscillatory mode and upon application of alternating current to said primary winding said rectifiers operate to rectify said alternating current to produce direct current energy, said direct current source including a battery, and said apparatus further including at least one electric outlet connected to said primary winding, and means including a switch for connecting a source of alternating current to said primary winding, the last said switch being movable to a closed position when the first said switch is in the open position.

3. Voltage conversion apparatus comprising a transistor oscillator having a transformer including at least one primary and one secondary winding, at least two transistors each having a base, an emitter element and a collector element, a tap on said secondary winding, connections between one element of each transistor and said centertap, connections between the other element of each transistor and an end terminal of said secondary winding, and means for applying signals to the bases of said transistors of selected phase relationships to the currents generated in said secondary winding, the first said connections including means together with a series connected switch for applying battery power between said one element of each transistor and the centertap, to effect the generation of oscillatory currents in said secondary and producing alternating current power in said primary winding, at least two series connected rectifiers, a connection between the junction of said rectifiers and one side of said battery power applying means, connections between the other terminals of said rectifiers and said other elements, whereby closure of said switch applies energy to said oscillator with a rectifier bridging the elements of each transistor and generating alternating current energy in said primary winding, means including a second switch for applying alternating current to said primary winding, the first and second switches being operable out of phase and in response to the presence of alternating current power at the last said means whereby the presence of alternating current power closes the second switch and opens the first switch to energize the transformer and apply rectified energy to said battery.

4. An emergency power supply unit for providing substantially uninterrupted power to a load comprising a receptacle for attachment of a load to said power supply, a relay including a coil and contacts operated thereby, a reversible converter operable under one mode to convert direct current to alternating current and under another mode to rectify alternating current, means including terminals for connecting said power supply to a primary source of alternating current, means connecting said terminals to said converter and relay coil, a circuit including connections between certain of said relay contacts, said terminals and said receptacle to open the last said circuit upon interruption of said primary source, connections between said converter and the other of said relay contacts to operate said converter in the rectifying mode when energy is supplied by the primary source and in the converting mode when the primary source fails, a manually operated generator having a direct current output and connected to said converter and a battery connected to said generator output, said generator and battery collectively and individually operating said converter when in the converting mode to supply alternating current to said receptacle and said converter when in the rectifying mode charging said battery, said reversible converter comprising a transistor oscillator having a transformer including at least one primary and one secondary winding, at least two transistors each having a base, an emitter element and a collector element, a tap on said secondary winding, connections between one element of each transistor and said centertap, connections of the other element of each transistor and an end terminal of said secondary winding, and means for applying signals to the bases of said transistors of selected phase relationships to the currents generated in said secondary winding, the first said connections including means for applying direct current energy to effect the generation of oscillatory currents in said secondary and producing alternating current power in said primary winding, at least two series connected rectifiers, a connection between the junction of said rectifiers and one side of said direct current applying means, connections between each of the other terminals of said rectifiers and said other elements and switch means in circuit between said one side of said direct current supplying means and said one element of each transistor whereby closure of said switch applies energy to said oscillator with a rectifier bridging the elements of each transistor and generating alternating current energy in said primary winding, and upon opening of said switch interrupts said oscillatory mode and upon application of alternating current to said primary winding said rectifiers operate to rectify said alternating current to produce direct current energy.

5. An emergency power supply comprising a frame, a housing carried by said frame, an electric generator within said housing, pedal-operated means including a speed changing coupling means for rotation of said generator, electric energy inverting and converting means within said housing, the last said means being operable in one mode to convert low voltage direct current to high voltage alternating current and in another mode to convert high voltage alternating current to low voltage direct current, first terminal means on said housing for attachment of a primary source of alternating current having a voltage corresponding to the magnitude of the alternating current produced by said electric energy means when in said one mode, second terminal means on said housing for connection of a battery power source, an outlet receptacle for attachment of a load, relay means within said housing and having a coil connected to said first terminal means and a plurality of electric contacts operated by said coil, connections between certain of said contacts said receptacle and the first terminal means to connect the first said terminal means to the receptacle to energize both the load and said electric energy means when energy is available from said primary source, connections between other of said contacts and said energy converting means to place the last said means in said other mode during the supply of primary source energy and in said one mode upon failure of said primary source, connections between said second terminal means and said electric energy means to charge the battery connected to said second terminal means when the electric energy means is in said other mode, and control means connecting said generator to said second terminal means, said relay upon failure of said primary power source operating to disconnect at least one of the first said terminals from said outlet receptacle and change said electric energy means to said one mode to cause said battery to energize the load, said generator being operable to supply energy to both said battery and to said electric energy means.

References Cited by the Examiner

UNITED STATES PATENTS

| 1,454,144 | 5/1923  | Zadig _____ 320—61    |
| 2,139,330 | 12/1938 | Gilson _____ 307—66    |
| 2,170,546 | 8/1939  | Candor et al. _____ 320—61   |
| 2,539,535 | 1/1951  | Espenschied _____ 290—1    |
| 2,747,108 | 5/1956  | Pelavin _____ 307—66   |
| 2,760,084 | 8/1956  | Hammond et al. _____ 307—66    |
| 2,990,519 | 6/1961  | Wagner.                         |
| 3,015,771 | 1/1962  | Mesenhimer _____ 321—45 X     |
| 3,042,808 | 7/1962  | Jackson _____ 290—1    |
| 3,044,023 | 7/1962  | Floyd.                          |
| 3,048,764 | 8/1962  | Murphy _____ 321—2     |
| 3,095,533 | 6/1963  | Keizer _____ 321—2    |
| 3,098,200 | 7/1963  | Jensen.                         |
| 3,098,201 | 7/1963  | Smedema et al.                  |

FOREIGN PATENTS 421,861  1/1935  Great Britain.

ORIS L. RADER, *Primary Examiner.*